United States Patent
Werner et al.

(10) Patent No.: US 7,841,230 B2
(45) Date of Patent: Nov. 30, 2010

(54) STABILIZING DEVICE AND METHOD FOR HANDHELD MEASUREMENT DEVICE

(75) Inventors: Gregory J. Werner, Puyallup, WA (US); Kate Ackerman, Seattle, WA (US)

(73) Assignee: The Boeing Company, Chicago, IL (US)

( * ) Notice: Subject to any disclaimer, the term of this patent is extended or adjusted under 35 U.S.C. 154(b) by 549 days.

(21) Appl. No.: 11/938,996

(22) Filed: Nov. 13, 2007

(65) Prior Publication Data
US 2009/0120173 A1    May 14, 2009

(51) Int. Cl.
*G01D 11/30*    (2006.01)
(52) U.S. Cl. .................. 73/104; 73/866.5
(58) Field of Classification Search ............ 73/104, 73/866.5
See application file for complete search history.

(56) References Cited

U.S. PATENT DOCUMENTS

| | | | | |
|---|---|---|---|---|
| 2,889,828 A | * | 6/1959 | Butler | 137/557 |
| 4,593,186 A | * | 6/1986 | Swartz et al. | 235/462.36 |
| 5,065,249 A | * | 11/1991 | Horn et al. | 348/376 |
| 5,111,983 A | * | 5/1992 | Simmons et al. | 224/258 |
| 5,551,615 A | * | 9/1996 | McIntosh | 224/270 |
| 5,747,785 A | * | 5/1998 | Miller et al. | 235/472.01 |
| 5,978,772 A | * | 11/1999 | Mold | 705/16 |
| 6,853,293 B2 | * | 2/2005 | Swartz et al. | 340/5.92 |
| 6,955,484 B2 | * | 10/2005 | Woodman | 396/423 |
| 6,984,825 B2 | | 1/2006 | Shelley et al. | |
| 7,115,869 B2 | | 10/2006 | Shelley et al. | |

* cited by examiner

*Primary Examiner*—Thomas P Noland
(74) *Attorney, Agent, or Firm*—Tung & Associates

(57) ABSTRACT

A stabilizing device for a handheld measurement device. An illustrative embodiment of the stabilizing device includes a device harness adapted to receive the handheld measurement device and having a handle opening and a nose opening and at least one harness attachment device carried by the device harness. A method for taking surface measurements with a handheld measurement device is also disclosed.

5 Claims, 4 Drawing Sheets

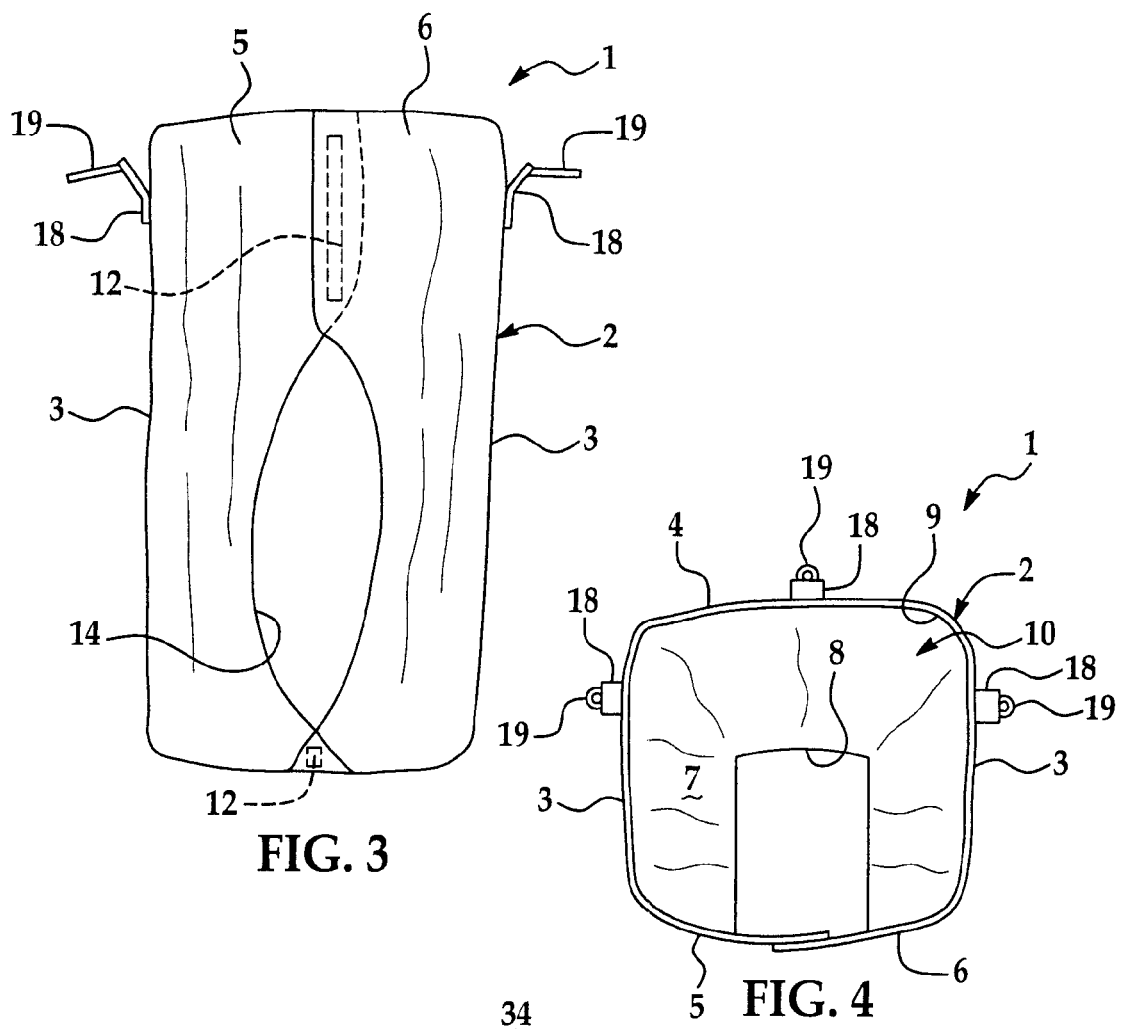
FIG. 3
FIG. 4
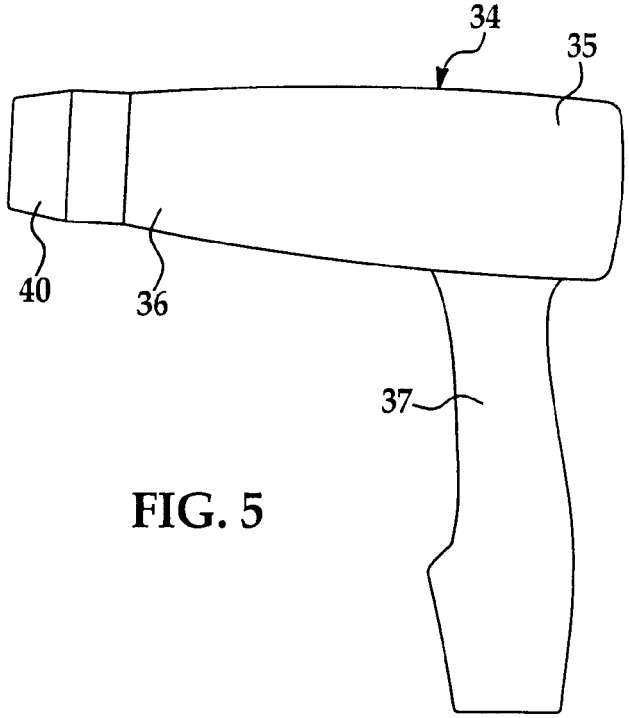
FIG. 5

STABILIZING DEVICE AND METHOD FOR HANDHELD MEASUREMENT DEVICE

TECHNICAL FIELD

The disclosure relates to handheld measurement devices for measuring surface characteristics. More particularly, the disclosure relates to a stabilizing device and method for stabilizing a handheld measurement device against a surface during surface measurements.

BACKGROUND

In various industries including the aerospace industry, handheld measurement devices may be used to measure various characteristics of a fabricated surface such as the chemical properties, coating thickness or thermal damage, for example and without limitation, of the surface. These handheld measurement devices may generally include a body portion having a nose or measurement end and a handle which extends from the body portion. During a measurement scan using the device, a technician may grip the handle and hold the nose or measurement end of the device against the surface which is being measured and squeeze a trigger to activate the device. The measurement which is being taken may require that this position of the device be held for as long as 90 seconds and may require repeated scans. It may therefore become difficult, cumbersome and uncomfortable for the technician to continually hold the device against the surface without movement or wobbling, particularly over the time period which is required for accurate measurement. Any movement of the device during the scan may result in inaccurate measurement spectra.

SUMMARY

The disclosure is generally directed to a stabilizing device for a handheld measurement device. An illustrative embodiment of the stabilizing device includes a device harness adapted to receive the handheld measurement device and having a handle opening and a nose opening and at least one harness attachment device carried by the device harness.

A method for taking surface measurements with a handheld measurement device is also disclosed. An illustrative embodiment of the method includes providing a handheld measurement device; providing a device harness; placing the handheld measurement device in the device harness; fastening at least one harness attachment device to the device harness; attaching the at least one harness attachment device to a surface to be measured; and initiating measurement of the surface using the handheld measurement device.

BRIEF DESCRIPTION OF THE ILLUSTRATIONS

FIG. 3 is a bottom view of a device harness of an illustrative embodiment of the stabilizing device.

FIG. 4 is a rear view of a device harness of an illustrative embodiment of the stabilizing device.

FIG. 5 is an exploded side view of a handheld measurement device which is suitable for implementation of an illustrative embodiment of the stabilizing device, further illustrating attachment of a stabilizing nose cap to the handheld measurement device.

DETAILED DESCRIPTION

Figure 1:
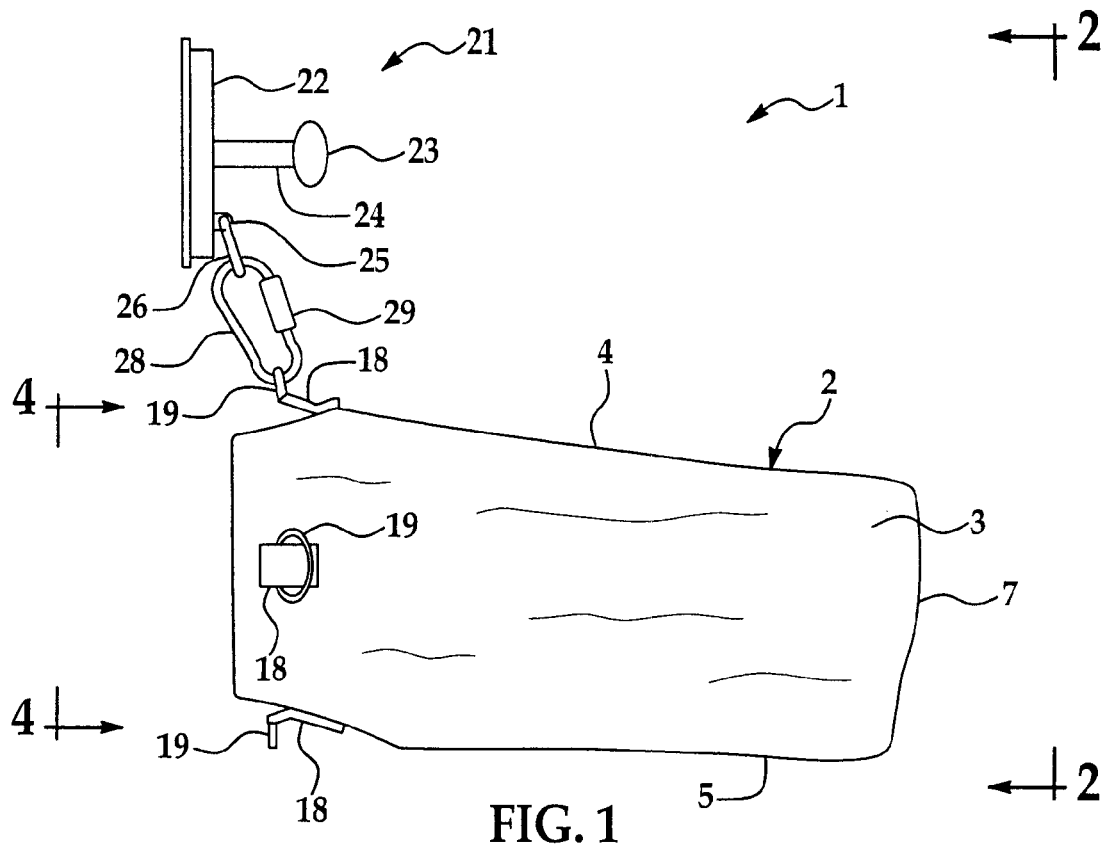
FIG. 1 is a side view of an illustrative embodiment of the stabilizing device.

The disclosure is generally directed to a stabilizing device and method for a handheld measurement device which may be used to measure surface characteristics such as the chemical characteristics, coating thickness or thermal damage, for example and without limitation, of a surface. The stabilizing device may stabilize the handheld measurement device against the surface to be measured and prevent or minimize inadvertent hand-induced movement of the handheld measurement device on the surface during the measurement. This may enhance the accuracy of measurements which are taken using the handheld measurement device. As used herein, relative terms such as "side", "top", "bottom", "front" and "rear" are for descriptive purposes only and are not to be construed in a limiting sense.

Referring initially to FIG. 5, an illustrative handheld measurement device 34 which is suitable for implementation of an illustrative embodiment of the stabilizing device and method is shown. The handheld measurement device 34 may be conventional and may include a generally elongated body portion 35. A generally tapered nose portion 36 may correspond to the measurement end of the body portion 35. A generally elongated handle 37 may extend from the body portion 35. In some applications, the handheld measurement device 34 may be a PHAZIR (trademark) handheld NIR analyzer. However, the stabilizing device 1 is suitable for use with any type of handheld measurement device 34 which is adapted to be held against a surface for the purpose of measurement and/or analysis of the surface.

Figure 2:
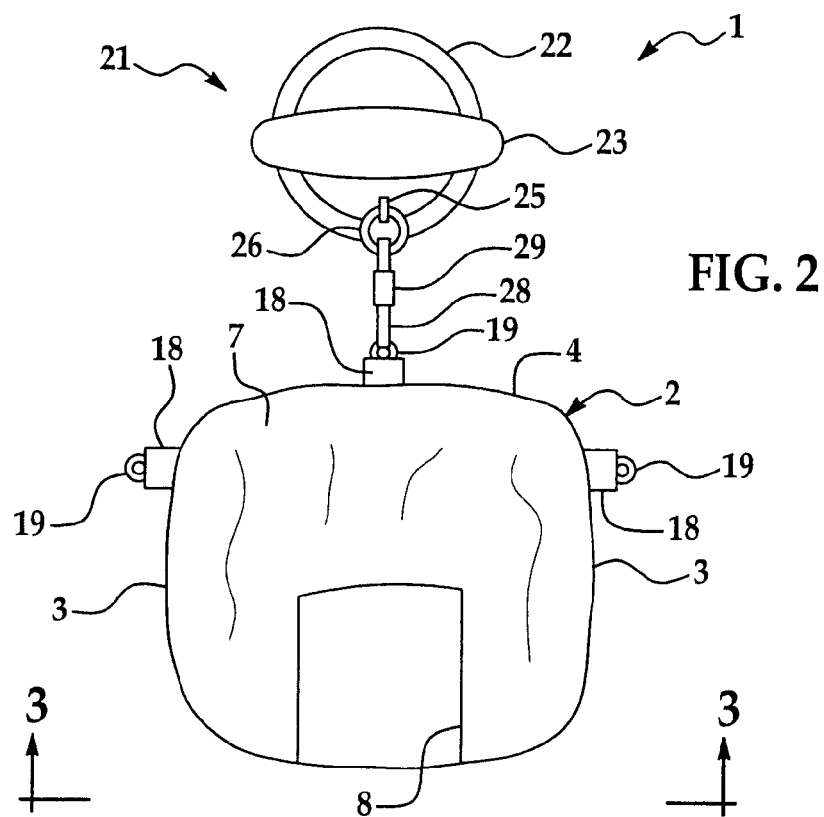
FIG. 2 is a rear view of an illustrative embodiment of the stabilizing device.

Referring initially to FIGS. 1-4, an illustrative embodiment of the stabilizing device is generally indicated by reference numeral 1. The stabilizing device 1 may include a device harness 2. The device harness 2 may be fabricated of a flexible fabric or sheet material, for example and without limitation, and may include a pair of spaced-apart side harness portions 3; a top harness portion 4 which connects the side harness portions 3; a pair of bottom harness portions 5, 6 (FIG. 3) which extend from the respective side harness portions 3; and a rear harness portion 7. As shown in FIG. 2, a rear opening 8 may be provided in the rear harness portion 7. As shown in FIG. 4, the device harness 2 may have a harness interior 10 which may be defined by the side harness portions 3; the top harness portion 4; the bottom harness portions 5 and 6; and the rear harness portion 7. A nose opening 9 may be defined by the side harness portions 3, the top harness portion 4 and the bottom harness portions 5 and 6 and may communicate with the harness interior 10.

As shown in FIG. 3, a handle opening 14 may be defined in the respective edges of the bottom harness portions 5 and 6. A fastening mechanism 12 may be provided on the bottom harness portions 5 and 6 to facilitate detachable fastening of the bottom harness portions 5 and 6 to each other. The fastening mechanism 12 may be any type of mechanism which is suitable for detachably fastening the bottom harness portions 5 and 6 to each other, including but not limited to hook and loop fasteners and snaps.

In typical application of the stabilizing device 1, which will be hereinafter described, the body portion 35 (FIG. 5) of the handheld measurement device 34 is fastened in the harness interior 10 of the device harness 2. The nose portion 36 of the handheld measurement device 34 extends through the nose opening 9 (FIG. 4), whereas the handle 37 of the handheld measurement device 34 extends through the handle opening 14 (FIG. 3), of the device harness 2. In accordance with the present disclosure, a stabilizing nose cap 40 may be detachably fitted to the nose portion 36 to stabilize the nose portion 36 against the surface 44 (FIG. 6) which is to be measured. The stabilizing nose cap 40 may stabilize the nose portion 36 by increasing the surface area of contact between the nose portion 36 and the surface 44 during measurement.

As shown in FIGS. 1 and 2, at least one harness attachment device 21 may be fastened to the device harness 2. The harness attachment device 21 may be any type of device which is suitable for detachably attaching or tethering the device harness 2 to a surface 44 (FIG. 6) which is to be measured using the handheld measurement device 34 (FIG. 5), as will be hereinafter described. In some embodiments, the harness attachment device 21 may include a suction cup 22. A suction cup handle 23 may be attached to the suction cup 22. A handle shaft 24 may extend from the suction cup 22, in which case the suction cup handle 23 may be provided on the handle shaft 24.

The suction cup 22 may be attached or tethered to the device harness 2 through any suitable arrangement which is suitable for the purpose. In some embodiments, a lanyard ring tab 25 may extend from the suction cup 22. A lanyard ring 26 may be attached to the lanyard ring tab 25. A lanyard clip 28, which may be fitted with a lanyard clip latch 29, may be attached to the lanyard ring 26.

The lanyard clip 28 may be attached to the device harness 2 using any suitable attachment technique. In some embodiments, at least one lanyard fastening ring 19 may be attached to the device harness 2. Each lanyard fastening ring 19 may be attached to the device harness 2 through a fastening tab 18 which may be sewn or otherwise attached to the device harness 2. The lanyard clip 28 may be attached to the lanyard fastening ring 19 by, for example, opening the lanyard clip latch 29; sliding the lanyard fastening ring 19 into the lanyard clip 28 through the open lanyard clip latch 29; and closing the lanyard clip latch 29.

The attachment point for the harness attachment device 21 may be provided at any location on the device harness 2 which facilitates tethering of the device harness 2 to the harness attachment device 21 in such a manner that the nose portion 36 (FIG. 5) of the handheld measurement device 34 can be positioned and stabilized against the surface 44 (FIG. 6) which is to be tested. In some embodiments, multiple attachment points for one or multiple harness attachment devices 21 may be provided on the device harness 2. Accordingly, as shown in FIG. 2, lanyard fastening rings 19 may be provided on the side harness portions 3 and the top harness portion 4, respectively, of the device harness 2. As shown in FIG. 1, an additional lanyard fastening ring 19 may be provided on one of the bottom harness portions 5, 6. The multiple attachment points facilitate flexibility in tethering the device harness 2 to the surface 44 (FIG. 6) which is to be measured using the handheld measurement device 34, depending on the particular application.

Figure 6:
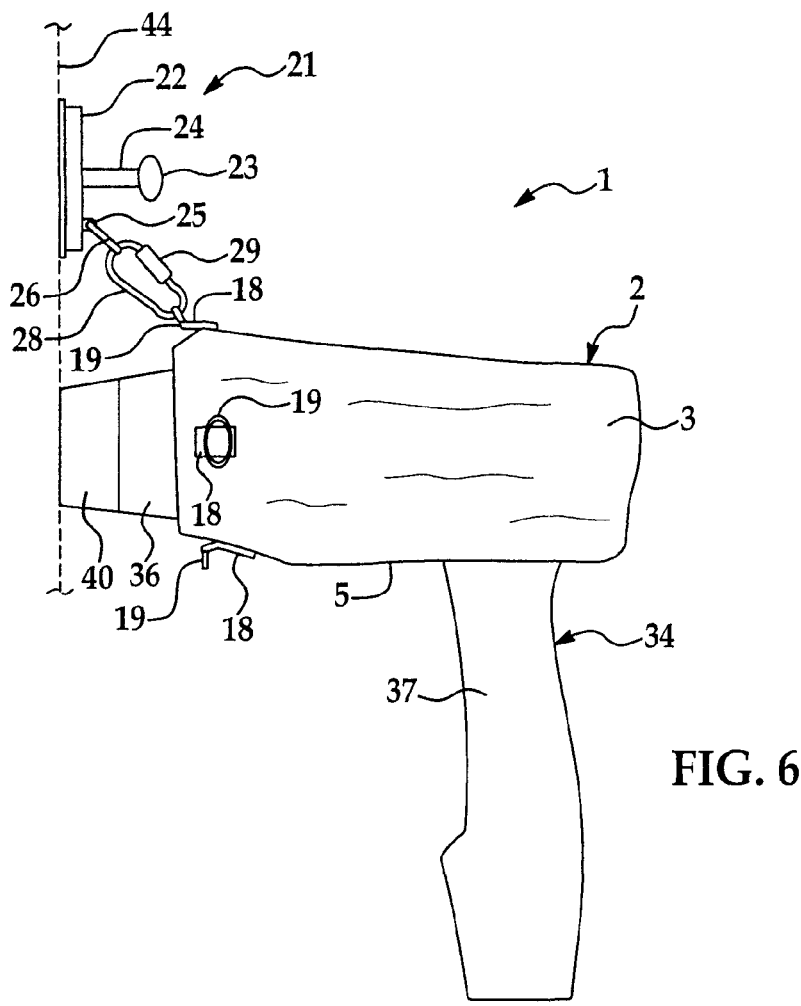
FIG. 6 is a side view of an illustrative embodiment of the stabilizing device, with a handheld measurement device provided in the harness of the stabilizing device and a harness attachment device of the stabilizing device attached to a surface during measurement of the surface with the handheld measurement device.

Referring next to FIGS. 5 and 6, in typical application of the stabilizing device 1, the handheld measurement device 34 is used to measure one or more characteristics of the surface 44. The surface 44 may be, for example and without limitation, a surface of an aircraft fuselage. The handheld measurement device 34 may be used to measure such parameters as a coating thickness or thermal damage, for example and without limitation, of the surface 44.

As shown in FIG. 5, the stabilizing nose cap 40 may be fitted on the nose portion 36 of the handheld measurement device 34. The body portion 35 of the handheld measurement device 34 may be placed in the harness interior 10 (FIG. 4) of the device harness 2. This may be accomplished by unfastening of the fastening mechanism 12 (FIG. 3) to detach the bottom harness portions 5, 6 from each other and inserting the body portion 35 into the open harness interior 10. The bottom harness portions 5 and 6 are then fastened around the body portion 35 by re-attachment of the fastening mechanism 12, with the nose portion 36 and the handle 37 of the handheld measurement device 34 extending through the nose opening 9 (FIG. 4) and the handle opening 14 (FIG. 3), respectively, of the device harness 2.

At least one harness attachment device 21 is attached to the device harness 2 at one or multiple attachment points (which may be defined by one or more, respectively, of the lanyard fastening rings 19) on the device harness 2. As shown in FIG. 6, the harness attachment device 21 is then attached to the surface 44 which is to be tested. This may be accomplished by grasping the suction cup handle 23 and pressing the suction cup 22 against the surface 44. The stabilizing nose cap 40 is placed against the surface 44. A technician (not shown) grips the handle 37 of the handheld measurement device 34 and places a slight forward tension against the handle 37. This maintains the lanyard ring 26, lanyard clip 28 and lanyard fastening ring 19 to which the lanyard ring 26 is attached in a taut configuration and the stabilizing nose cap 40 in a flush and steady stance against the surface 44. A trigger (not shown) on the handle 37 may be squeezed for a time period of typically about 60-90 seconds or more to facilitate the measurement.

It will be appreciated by those skilled in the art that the stabilizing device 1 may prevent inadvertent movement of the handheld measurement device 34 and impart comfort to the technician throughout the measurement scan. Furthermore, the stabilizing nose cap 40 may prevent or minimize rocking of the nose portion 36 with respect to the surface 44. This may enhance the quality of the measurement spectra obtained during the scan and prevent or minimize the need for repeated scans. After measurement, the harness attachment device 21 may be detached from the surface 44 and the handheld measurement device 34 may be removed from the device harness 2. In some applications, the stabilizing device 1 may facilitate hands-free operation of the handheld measurement device 34.

Figure 7:
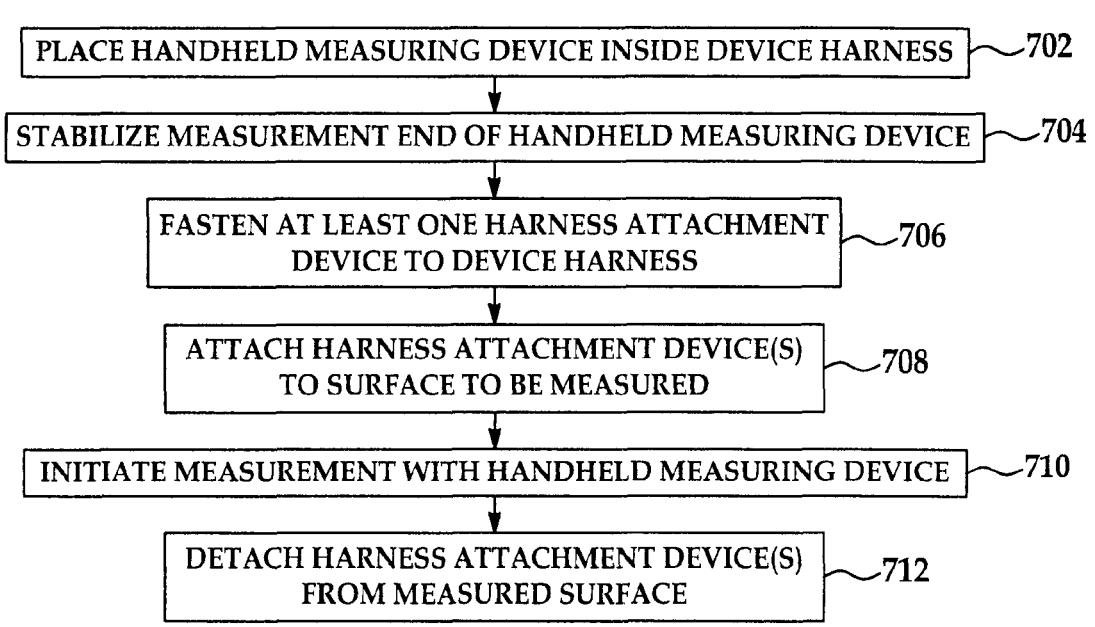
FIG. 7 is a flow diagram which illustrates an illustrative method for taking surface measurements with a handheld measurement device.

Referring to FIG. 7, a flow diagram 700 which illustrates an illustrative method for taking surface measurements with a handheld measurement device is shown. In block 702, a handheld measurement device is placed inside a device harness. In block 704, the measurement end of the handheld measurement device may be stabilized. This may be facilitated by placing a stabilizing nose cap on the measurement end of the handheld measurement device. In block 706, at least one harness attachment device is fastened to the device harness. In block 708, the harness attachment device or devices is/are attached to a surface to be measured. In block 710, measurement is initiated using the handheld measurement device. In block 712, the harness attachment device(s) may be detached from the measured surface.

Figure 8:
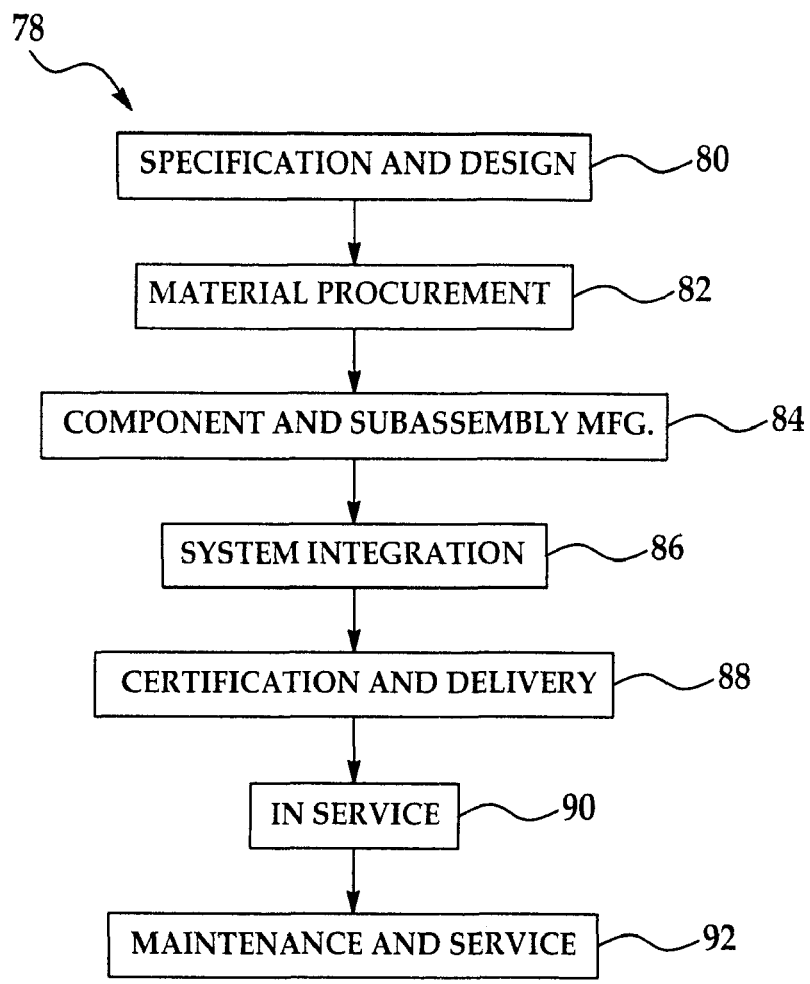
FIG. 8 is a flow diagram of an aircraft production and service methodology.
Figure 9:
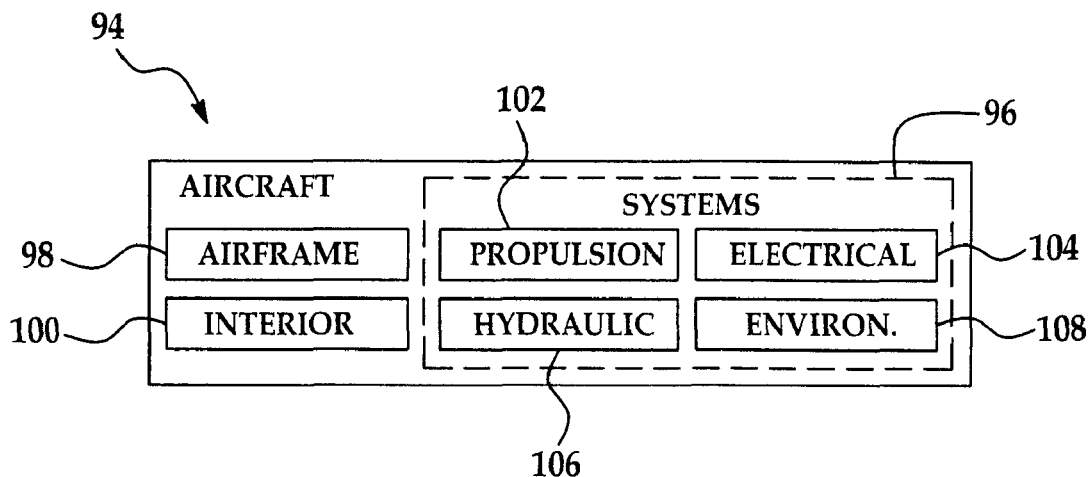
FIG. 9 is a block diagram of an aircraft.

Referring next to FIGS. 8 and 9, embodiments of the disclosure may be used in the context of an aircraft manufacturing and service method 78 as shown in FIG. 8 and an aircraft 94 as shown in FIG. 9. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 9, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method for taking surface measurements with a handheld measurement device, comprising:
   providing a handheld measurement device;
   providing a device harness;
   placing said handheld measurement device in said device harness;
   fastening at least one harness attachment device to said device harness;
   attaching said at least one harness attachment device to a surface to be measured; and
   initiating measurement of said surface using said handheld measurement device.

2. The method of claim 1 further comprising stabilizing a measurement end of said handheld measurement device.

3. The method of claim 2 wherein said stabilizing a measurement end of said handheld measurement device comprises fitting a stabilizing nose cap on said measurement end of said handheld measurement device.

4. The method of claim 1 wherein said at least one harness attachment device comprises at least one suction cup and wherein said attaching said at least one harness attachment device to a surface to be measured comprises attaching said at least one suction cup to said surface to be measured.

5. A method for taking surface measurements with a handheld measurement device having a generally elongated body portion, a nose portion provided on the body portion and a handle extending from the body portion, comprising:
   providing a handheld measurement device;
   providing a device harness;
   placing said handheld measurement device in said device harness;
   fastening at least one suction cup to said device harness;
   attaching said at least one suction cup to a surface to be measured;
   stabilizing a measurement end of said handheld measurement device by fitting a stabilizing nose cap on said measurement end of said handheld measurement device and placing said stabilizing nose cap against said surface to be measured; and
   initiating measurement of said surface using said handheld measurement device.

* * * * *